United States Patent Office 2,857,277
Patented Oct. 21, 1958

2,857,277

LIGHT-SENSITIVE PHOTOGRAPHIC ELEMENTS CONTAINING BIS-AZOPYRAZOLONES BLEACHABLE IN FERRICYANIDE COMPOSITIONS

Joseph A. Sprung, Binghamton, N. Y., assignor to General Aniline & Film Corporation, New York, N. Y., a corporation of Delaware No Drawing. Application February 18, 1957
Serial No. 640,600

5 Claims. (Cl. 96—84)

This invention relates to color photography and particularly to bis-azopyrazolones as filters, and anti-halation dyes for photographic color film.

It is known in the art of making photographic materials, such as multilayer color films, that color separation by the various layers is facilitated by the use of filters, either incorporated directly into the emulsion layers or added as adjacent layers in the appropriate sequence. For example, blue light passing through the unsensitized blue sensitive layer must be absorbed by a "minus blue" (i. e., yellow) filter to prevent it from exposing the underlying ortho and panchromatic emulsion layers which are likewise sensitive to blue light. Similarly, green absorbing filters are frequently desirable in order to obtain a better separation between the orthochromatic and the panchromatic layers. Other filters with special characteristics are occasionally used, depending upon the absorption desired.

In a similar manner, colored light-absorbing layers are frequently used adjacent to a photographic support to prevent light scattering or halation effects caused by refraction of light rays from the support onto the sensitive layer. Such layers are commonly known as anti-halation layers.

In order to perform their desired function, filter and anti-halation materials must be reasonably stable in a colloidal carrier. They must be non-diffusing and readily removable in the customary processing baths. Moreover, it is essential that they have no injurious effects, such as fogging action, on the emulsion layers. Many materials suggested in the art as suitable for filter layers fail to meet these requirements.

It has been proposed to utilize various azopyrazolones in the preparation of photographic color film. Azopyrazolones, which are derived from aromatic diazotizable amines containing a variety of substituents in the aromatic nucleus on the one hand, and pyrazolone couplers on the other, have been employed as colored couplers in a gelatino silver-halide layer either alone or in admixture with uncolored couplers for the production of color corrected (masking) images. The colored couplers containing an azo substituent in the reactive coupling position are cleaved imagewise during color forming development to yield a coupler which reacts with the oxidation product of an aromatic primary amino developer in the usual manner to form azomethine dye images.

Azopyrazolones having the function of a filter dye and a color coupler have been utilized in at least one of the silver-halide emulsion layers of a light sensitive multilayer material. The azo dye is first utilized as a filter dye and then destroyed by chemical reducing baths, such as sodium hydrosulfite solution or a black and white developer containing a fairly large amount of sodium sulfite to yield a compound which is capable of forming a dye by the process of color development.

Azo dyes containing electronegative substituents have also been utilized as non-diffusing filter and/or image forming dyes in light sensitive photographic materials. The azo dyes may be discharged indiscriminately, after serving their function of filter dyes, by means of sodium hydrosulfite or sodium stannite solutions, or when used in the silver azo dye bleachout process may be bleached imagewise at the silver image by means of a specially compounded bleach or reducing solution.

The area of employment of the azopyrazolones as filter and anti-halation dyes was greatly expanded with the discovery that such dyes would bleach in ferricyanide bleach solutions provided that the aromatic radical joined to the pyrazolone by the azo group was the residue of a diazotizable amine having a potent electropositive substituent in the molecule and in this connection reference is made to my U. S. Patent 2,687,957, granted August 31, 1954, of which the present invention is an improvement.

Typically this patent discloses that azopyrazolones of the type obtained by coupling a 5-pyrazolone containing a non-diffusing group in the 1- or 3- position with a diazotized amine of the formula

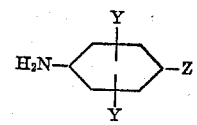

wherein Z is a potent electropositive group such as hydroxyl or an amino group, and Y is hydrogen, halogen, alkyl or the like, could be discharged by ferricyanide bleach compositions customarily used in film processing. It is stated that both the electropositive substituent Z and the pyrazolone ring must be present if the dye is to have good discharge characteristics. When Z is a substituted amino group, the dyes are magenta in color, whereas when Z is hydroxyl, the dyes are yellow in color. The yellow dyes could be most effectively bleached in ferricyanide compositions at alkaline pH values.

From the prior art it is known that alkaline ferricyanide bleach compositions are not very stable and are corrosive to the stainless steel of the processing containers. Hence, the commercial compositions are usually buffered to a pH of 5 to 6.5. Commercial operations therefore demand a yellow filter dye which could be readily discharged in acid buffered ferricyanide compositions.

I have now discovered that this demand is met by non-diffusing bis-azopyrazolones in which two pyrazolone nuclei are joined at their 4-position through an azo bridge and the provision of such dyes constitute an object of this invention.

Another object is to provide non-diffusing bis-azopyrazolones as filter and anti-halation dyes which are unaffected in the usual processing baths but are readily dischargeable and bleached in a standard bleach composition normally employed for the removal of metallic silver.

A still further object is to provide bis-azopyrazolones for the filter and anti-halation layers of the multilayer color film.

Other objects and advantages of this invention will become apparent as the description proceeds.

Any non-diffusing bis-azopyrazolones in which the two pyrazolone nuclei are joined through their 4-position by an azo bridge is particularly adaptable for the preparation of the filter and anti-halation layers contemplated herein. The bis-azopyrazolone so constituted, after serving its function as a filter or antihalation dye, is readily dischargeable in a ferricyanide bleach bath during the usual process after exposure, color development, or black and white development, followed by color development (in the case of a reversible multilayer film). Chromogenic development involving the bis-azopyrazolone does not ensue because the azo group of the pyrazolone is not displaced imagewise during color development inasmuch as it is not present in the silver-halide layer and is only destroyed or bleached indiscriminately when subjected to a treatment in a ferricyanide bleach bath composition which is normally employed to remove the metallic silver image.

The bis-azopyrazolones utilized according to the present invention are obtained by the coupling of a 4-diazo-5-pyrazolone to a 5-pyrazolone using a procedure as disclosed in Nies U. S. Patent 2,420,791. In the Nies disclosure it is stated that 4-amino-1-phenyl pyrazolones produce unstable diazonium salts unless a sulfonic acid group is present in the phenyl ring, and this has been verified by the present inventor.

The diazotized pyrazolones which I employ are 4-amino-3-alkyl-1-(X'sulfophenyl)-5 - pyrazolones which may be more specifically represented by the following formula:

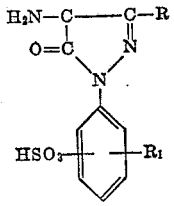

wherein R is alkyl such as methyl, ethyl, propyl, butyl, and the like, $R_1$ is hydrogen, alkyl as above; halogen, i. e., chlorine, bromine; sulfo; alkoxy, i. e., methoxy, ethoxy, propoxy, and the like.

Examples of suitable 4 - amino - 3 - alkyl - 1 - (X'sulfophenyl)-5-pyrazolones are the following:

4-amino-3-methyl-1-(4'-sulfophenyl)-5-pyrazolone
4-amino-3-ethyl-1-(4'-sulfophenyl)-5-pyrazolone
4 - amino - 3 - methyl - 1 - (2' - methyl - 4' - sulfophenyl)-5-pyrazolone
4 - amino - 3 - methyl - 1 - (2' - chloro - 4' - sulfophenyl)-5-pyrazolone
4 - amino - 3 - methyl - 1 - (2'- methoxy - 4'-sulfophenyl)-5-pyrazolone The coupling components used with the above diazonium compounds are non-diffusing 3-alkyl-1-phenyl-5-pyrazolones in which the alkyl group in the 3-position, or the phenyl radical in the 1-position contains a substituent having a carbon chain of at least 10 carbon atoms. These compounds may be more specifically represented by the following formula:

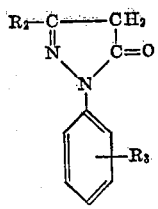

wherein $R_2$ is alkyl such as methyl, ethyl, propyl, butyl, caprylyl, capryl, undecylyl, lauryl, myristyl, palmityl, stearyl, etc., $R_3$ is alkyl, like $R_2$; halogen, i. e., chlorine, bromine; sulfo; carboxy; acylamino, i. e., acetylamino, propionylamino, lauroylamino, myristoylamino, stearoylamino, etc.; aroylamino, i. e., benzoylamino toluoylamino, etc.; sulfonamido, i. e., alkylsulfonamido, e. g., methylsulfonamido, ethylsulfonamido, propylsulfonamido, butylsulfonamido, etc.; arylsulfonamido, e. g., phenylsulfonamido, tolylsulfonamido, etc., alkylamino, i. e., methylamino, dimethylamino, ethylamino, diethylamino, propylamino, butylamino, etc., arylamino, i. e., phenylamino, naphthylamino, etc.

It is understood that either $R_2$ or $R_3$ may be a group capable of rendering the compound non-diffusing in the emulsion.

Suitable non-diffusing pyrazolone couplers are the following:

1-(3'-sulfo-5'-stearoylamino-6'-methylphenyl)-3 - methyl-5-pyrazalone
1-(4'-sulfophenyl)-3-(4'-stearoylaminophenyl)-5 - pyrazolone
1-(4'-stearoylaminophenyl)-3-methyl-5-pyrazolone
1-phenyl-3-heptadecyl-5-pyrazolone
1-(3-carboxyphenyl)-3-heptadecyl-5-pyrazolone
1-phenyl-3-heptadecylpyrazolone-4'-sulfonic acid
1-phenyl-3-undecylpyrazolone-3'-carboxylic acid
3-heptadecylpyrazolone-(5)-1-ethane-sulfonic acid
1-(phenyl-3'-methylene-ω-sulfonic acid) - 3 - heptadecyl-5-pyrazolone
1-(phenyl-4'-hydroxy-ethylene-ω-sulfonic acid)-3-undecyl-5-pyrazolone.
1-(α-naphthyl-4'-sulfo)-3-methyl-5-pyrazolone
1-β-naphthyl-3-p-chloroacetanilido-5-pyrazolone
1-phenyl-3-acet-α-naphthylamido-5-pyrazolone
1-(α-quinolyl)-3-anilino-5-pyrazolone
1-[p-(benzenesulfonamino)-phenyl]-3-methyl - 5 - pyrazolone
p-(3-methyl-5-pyrazolonyl-1)-benzenesulfonamide
1 - [p - (p'-phenoxybenzenesulfonamido)phenyl] - 3 - m-amyl-5-pyrazolone
1-(p-m-pentanesulfonamidophenyl)-3 - methyl - 5 - pyrazolone
3-heptadecyl-1-(2'-methyl-4'-sulfophenyl)-5-pyrazolone
3-methyl-1-(2'-methyl-3'-stearamido-5' - sulfophenyl) - 5-pyrazolone
1-(3'-carboxy-4'-chlorophenyl)-3-heptadecyl-5-pyrazolone In preparing the bis-azopyrazolones of this invention, a 3-alkyl-1-phenyl-5-pyrazolone having a sulfo radical in the 1-phenyl group is first nitrosated in dilute hydrochloric acid using sodium nitrite as a nitrosating agent. The resulting nitroso pyrazolone is then reduced by means of sodium hydrosulfite to give the corresponding 4-amino-5-pyrazolone which is then diazotized and the resulting 4-diazo-5-pyrazolone then coupled to a second 5-pyrazolone containing a group which renders the said pyrazolone non-diffusing in gelatin.

The bis-azopyrazolones produced as above are typified by the following structure:

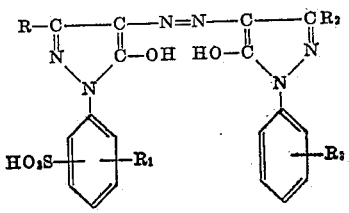

wherein R, $R_1$, $R_2$ and $R_3$ have the values listed above.

Examples of bis-azopyrazolones of the above type are illustrated in the following formulas:

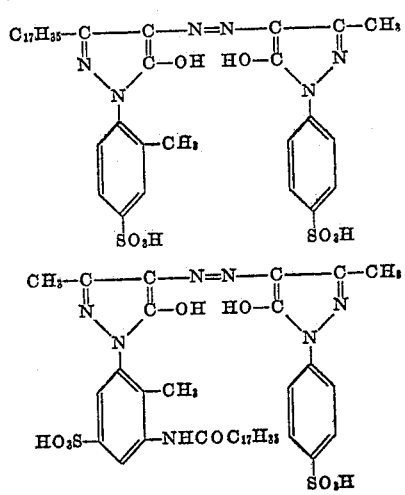

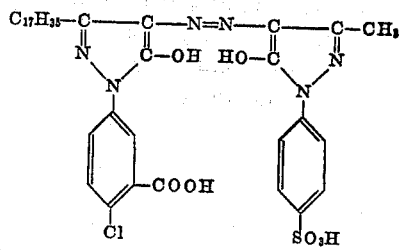

The bis-azopyrazolone dyes thus produced are reddish-orange in color but can be readily converted into yellow filter dyes by treatment with water soluble zinc salts such as zinc acetate, zinc chloride, zinc nitrate and the like.

The ferricyanide bleach solution employed in accordance with the present invention contains an alkali metal ferricyanide, such as sodium or potassium ferricyanide dissolved in water with an alkali metal halide, an alkali metal dibasic phosphate, citric acid and a hardener. The pH of the above bleach solution is approximately 5.0.

Filter and antihalo layers are prepared with the bis-azopyrazolone dyes by dispersing the dyes in a water soluble colloidal carrier such as gelatin, PVA, carboxymethyl cellulose, etc. coating and drying such layers.

The following examples describe the invention in detail, but it is to be understood that they are merely illustrative and are not to be construed as limiting the invention thereto.

EXAMPLE I

*4-amino-3-methyl-1-(4'sulfophenyl)-5-pyrazolone*

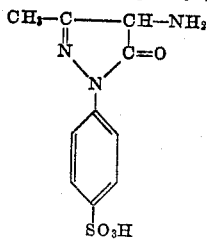

A suspension of 174.0 parts of 58.2% pure 3-methyl-1-(4'-sulfophenyl)-5-pyrazolone in 1500.0 parts of water and 332.0 parts of concentrated hydrochloric acid was cooled to 5° C. and was nitrosated with a solution of 28.0 parts of sodium nitrite in 200 parts of water. As nitrosation occurred, the suspended material dissolved to perform a deep orange solution. The solution was treated with 150.0 parts of sodium chloride, and the salted out nitroso pyrazolone was removed by filtration and was washed with 15% sodium chloride solution.

The wet filter cake was suspended in 1000 parts of water, treated with 108 parts of concentrated ammonium hydroxide and was brought into solution by heating it to 80° C. The hot orange colored solution was treated in small portions with approximately 250.0 parts of sodium hydrosulfite until it became straw colored. The solution was cooled in an ice bath and was acidified to Congo red with hydrochloric acid. The amino pyrazolone was removed by filtration, washed with cold water and was dried in an oven at 90° C. The yield was 95.5 parts.

EXAMPLE II

*Bis-azopyrazolone filter dye*

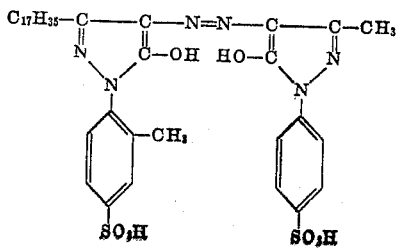

A suspension of 27.0 parts of 4-amino-3-methyl-1-(4'-sulfophenyl)-5-pyrazolone in 12.5 parts of concentrated hydrochloric acid and 150.0 parts of water was diazotized at 5° C. with 7.2 parts of sodium nitrite in 100 parts of water. The suspended material dissolved as the diazonium salt was produced. The excess nitrous acid was destroyed with urea, and the filtered diazonium salt solution was added to a solution of 50.0 parts of 3-heptadecyl-1-(2'-methyl-4'-sulfophenyl)-5-pyrazolone in 600 parts of 5% sodium hydroxide, and the whole was heated on a steam bath for two hours. Sodium chloride (100 parts) was added and the solution was acidified to Congo red with hydrochloric acid. The salted out mixture was allowed to remain in an icebox for 24 hours, and the semi-solid dye was removed by filtration and was washed with cold 15% sodium chloride. The material, after drying in an oven at 90° C., was extracted with 750 parts of boiling absolute ethanol. The ethanol solution was cooled in an ice bath, and the solid dye was removed by filtration, washed with cold absolute ethanol, and was dried in an oven at 90° C.

EXAMPLE III

*Preparation of yellow filter dye solution*

A solution of 15.0 parts of the orange-red colored bis-azopyrazolone from Example II, in 250.0 parts of hot water was treated with 30.0 parts of zinc acetate .2H$_2$O (5%) followed by 6.0 cc. of sodium hydroxide (10%). The resulting yellow filter dye solution was added to aqueous gelatin and was coated as a filter layer between the unsensitized and orthochromatic layers of a multi-layer color film.

The yellow filter layers were readily discharged in ferricyanide bleach compositions having a pH of 5 to 6.5.

Modifications of the invention will occur to persons skilled in the art. Thus it is to be understood that any of the above diazotized pyrazolones may be reacted with any of the given couplers to produce the bis-azopyrazolones. Similarly it is to be understood that the term "filter layer" as used in the claims, embraces "antihalation layers." I therefore do not intend to be limited in the patent granted except as necessitated by the appended claims.

I claim:

1. A photographic material comprising a support, a light-sensitive silver-halide emulsion layer and a filter layer free from silver-halide comprising the colloidal carrier having dispersed therein a non-diffusing bis-azopyrazolone selected from the class consisting of those of the following constitution:

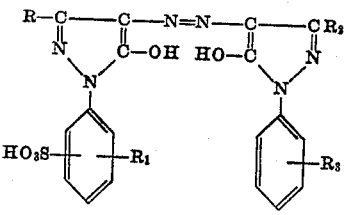

wherein R is alkyl, R$_1$ is selected from the class consisting of hydrogen, alkyl, halogen, sulfo, and alkoxy, R$_2$ is alkyl, and R$_3$ is selected from the class consisting of alkyl, halogen, sulfo, carboxy, acylamino, sulfonamido, alkylamino, and arylamino and zinc salts of said bis-azopyrazolones, said bis-azopyrazolones being completely decolorized in ferricyanide bleach solution having a pH on the acid side.

2. The article as defined in claim 1 wherein the silver halide emulsion layer contains a color component capable of coupling with the oxidation products of a primary amino developer to form a dye resistant to ferricyanide bleach baths.

3. The article as defined in claim 1 wherein the bis-azopyrazolone has the following formula:
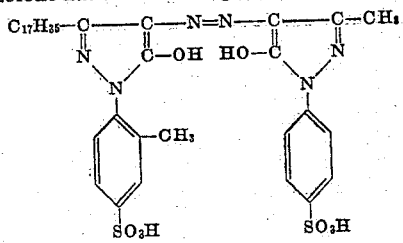
4. The article as defined in claim 1 wherein the bis-azopyrazolone has the following formula:
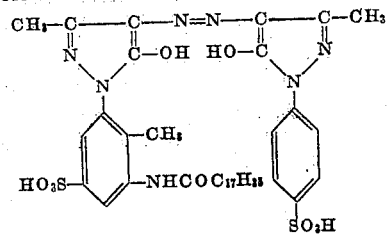
5. The article as defined in claim 1 wherein the bis-azopyrazolone has the following formula:
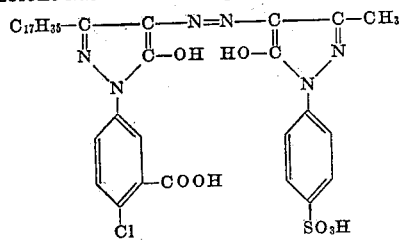
References Cited in the file of this patent
UNITED STATES PATENTS
| | | |
|---|---|---|
| 2,274,782 | Gaspar | Mar. 3, 1942 |
| 2,503,717 | Fierke et al. | Apr. 11, 1950 |
| 2,687,957 | Sprung | Aug. 31, 1954 |